United States Patent
Antoine et al.

(10) Patent No.: US 6,546,734 B2
(45) Date of Patent: Apr. 15, 2003

(54) PROCESS AND DEVICE FOR ATTENUATING THE NOISE MADE IN A TURBOMACHINE BY ROTOR/STATOR INTERACTION

(75) Inventors: Angélique Hélène Antoine, Corbeil Essonnes (FR); Eric Jean-Louis Bouty, Moissy Cramayel (FR); Alain Alphonse Léopold Thomas, Chartrettes (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/956,830

(22) Filed: Sep. 21, 2001

(65) Prior Publication Data

US 2002/0048511 A1 Apr. 25, 2002

(30) Foreign Application Priority Data

Sep. 21, 2000 (FR) .............................. 00 12016

(51) Int. Cl.⁷ .............................................. F02C 7/045
(52) U.S. Cl. ........................ 60/772; 60/226.1; 415/119
(58) Field of Search ................ 60/226.1, 772; 415/119

(56) References Cited

U.S. PATENT DOCUMENTS

| | | | | |
|---|---|---|---|---|
| 3,363,419 A | * | 1/1968 | Wilde | 60/226.1 |
| 3,572,960 A | * | 3/1971 | McBride | 415/119 |
| 4,199,295 A | | 4/1980 | Raffy et al. | |
| 4,255,083 A | | 3/1981 | Andre et al. | |
| 5,732,547 A | * | 3/1998 | Olsen et al. | 415/119 |
| 6,055,805 A | * | 5/2000 | El-Aini et al. | 60/226.1 |
| 6,409,469 B1 | * | 6/2002 | Tse | 415/119 |

FOREIGN PATENT DOCUMENTS

EP     0 899 427 A2    3/1999

* cited by examiner

*Primary Examiner*—Michael Koczo
(74) *Attorney, Agent, or Firm*—Oblon, Spivak, McClelland, Maier & Neustadt, P.C.

(57) ABSTRACT

A process for attenuating noise generated in a turbomachine by the interaction of rotor blades with stator vanes downstream of the rotor blades comprises the injection of a fluid in continuous jets upstream of the blades through a number of orifices equal to the number of vanes. The orifices are arranged in a ring and are capable of pivoting about the rotor axis by an angle at least equal to the angular pitch between two consecutive vanes. The angular position is controlled so that the sound waves produced by the interaction between the jets and the blades are of opposite phase to those produced by the interaction of the blades with the vanes.

9 Claims, 3 Drawing Sheets

PROCESS AND DEVICE FOR ATTENUATING THE NOISE MADE IN A TURBOMACHINE BY ROTOR/STATOR INTERACTION

BACKGROUND OF THE INVENTION

1. Field of the Invention

The invention relates to the attenuation of noise made in a turboengine by interaction between the blades of a rotor blade ring and the vanes of a stator vane ring disposed downstream of the rotor blade ring, wherein a counternoise of opposite phase to the noise is created by the injection of fluid through a number of orifices equal to the number of stator ring vanes.

2. Summary of the Prior Art

FR-A-2370170 specifies orifices in the flow duct downstream of the rotor blade ring, either before or aft of the vanes. The orifices are fixed relative to the stator but the fluid flow injected through each orifice must be modulated by a valve actuated at the frequency of the noise to be attenuated.

A modulating value must therefore be associated with each orifice and all the valves are controlled by an electronic servo control unit by a magneto-type electronic device to dephase the flow between the various orifices.

The system proposed by FR-A-2370170 to attenuate the noise arising from the interaction between the moving blades and the fixed vanes is therefore relatively complex and therefore very prone to failure.

SUMMARY OF THE INVENTION

It is an object of the invention to provide a simple process requiring few moving parts for attenuating noise arising from interaction between moving blades and fixed vanes disposed immediately downstream of the moving blades.

Accordingly, the invention proposes a process for attenuating noise generated by the interaction between a ring of moving rotor blades and a ring of fixed stator vanes in the flow channel of a turboengine, said fixed stator vanes being disposed downstream of said moving rotor blades, comprising the steps of providing a plurality of orifices, equal in number to the number of said fixed stator vanes, opening into said flow channel upstream of said ring of rotor blades, injecting a fluid into said flow channel through said orifices to form continuous jets of said fluid upstream of said ring of rotor blades, and adjusting the angular position of said orifices relative to said fixed stator vanes whereby sound waves generated by interaction between said jets of fluid and said moving rotor blades are of substantially opposite phase to sound waves generated by interaction between said moving rotor blades and said fixed stator vanes.

In the proposed process there is therefore no modulation of the jet deliveries, because the sound waves arising from interaction between the jets and the moving blades are at the same frequency as the sound waves arising from interaction between the moving blades and the fixed vanes.

In a first variant of the process the angular position of the orifices relative to the vanes is adjusted continuously.

In a second variant of the process the angular position of the orifices relative to the vanes is adjusted intermittently in dependence upon engine speed.

When the process according to the invention is used to attenuate the noise made by a fan of a bypass turbojet engine whose flow duct has a pylon or arms extending through it, the position and diameter of the injection orifices are so calculated as to take into account the velocity distortion caused by the pylon and the arms.

It is further object of the invention to provide a device for carrying the process into effect, and to this end the invention provides a device for attenuating noise generated by the interaction between a ring of moving rotor blades and a ring of fixed stator vanes in the flow channel of a turboengine, said fixed stator vanes being downstream of said moving rotor blades, comprising a ring mounted on the engine casing upstream of said ring of rotor blades and rotatable about the rotational axis of said ring of rotor blades through an angle at least equal to the angular pitch of the fixed stator vanes; a plurality of orifices, equal in number to the number of said fixed stator vanes, providing in said ring and opening into said flow channel upstream of said ring of rotor blades, means for injecting a fluid into said flow channel through said orifices to form continuous jets of said fluid upstream of said ring of rotor blades, and means for rotating said ring to adjust the angular position of said orifices relative to said fixed stator vanes whereby sound waves generated by interaction between said jets of fluid and said moving rotor blades are of substantially opposite phase to sound waves generated by interaction between said moving rotor blades and said fixed stator vanes.

To carry into effect the first variant of the process, the device also comprises a motor which drives the ring and is controlled by a controller. Preferably, the ring is disposed in an annular collector which is formed with an annular slot opposite the orifices.

To carry the second variant of the process into effect, the ring is disposed in a collector which is formed, opposite the path of the orifices and at the angular pitch of the vanes, with a plurality of distributed apertures of a diameter at least equal to the diameter of the corresponding orifice. The device also comprises means for positioning the orifices in front of a set of apertures in dependence upon engine speed.

Other advantages and features of the invention will become apparent from the following description of the preferred embodiments, given by way of example, and with reference to the accompanying drawings.

DESCRIPTION OF THE PREFERRED EMBODIMENT

Figure 1:
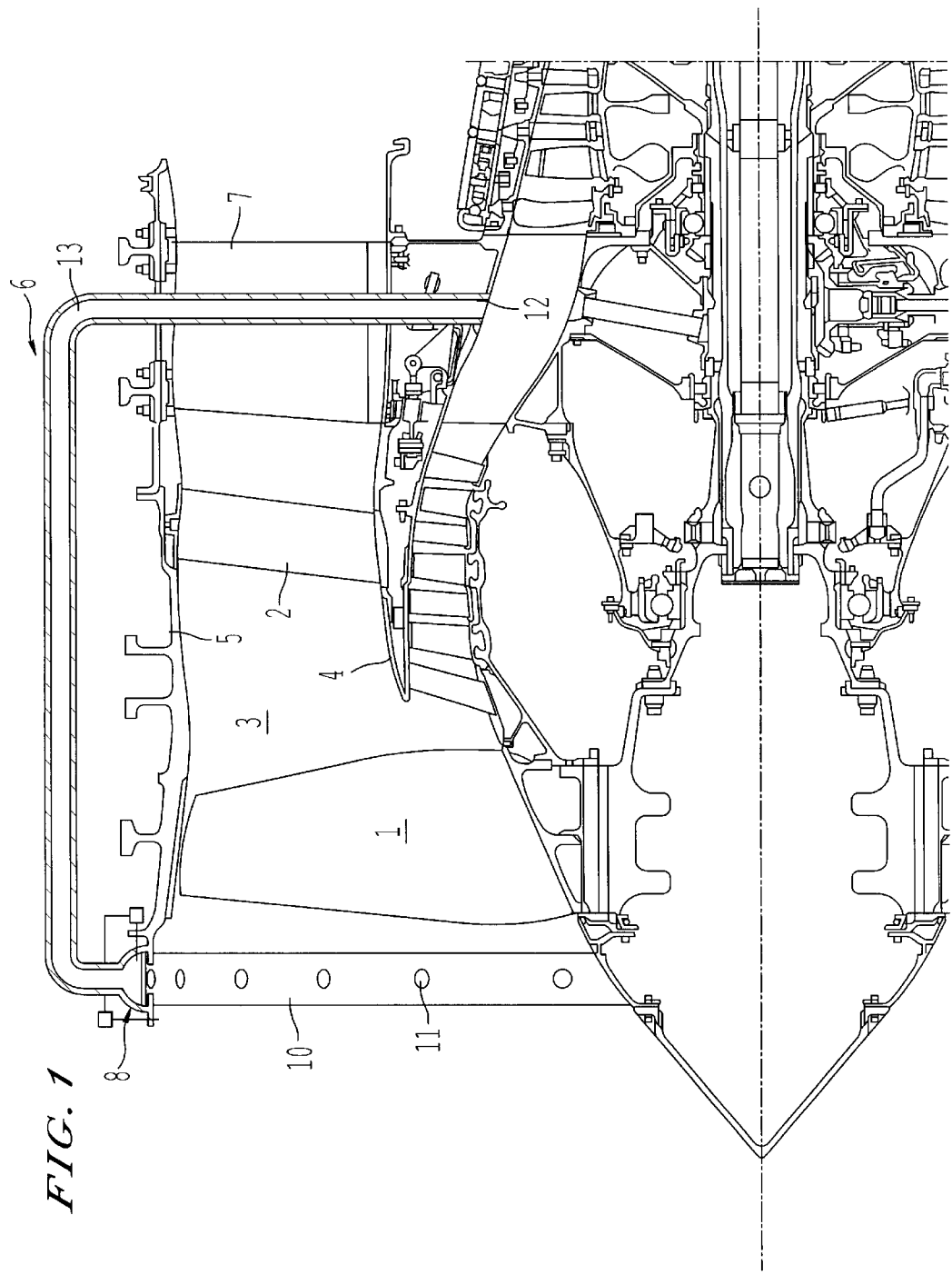
FIG. 1 shows a part sectional view of a turboengine equipped with one embodiment of the device for carrying out the process according to the invention.
Figure 2:
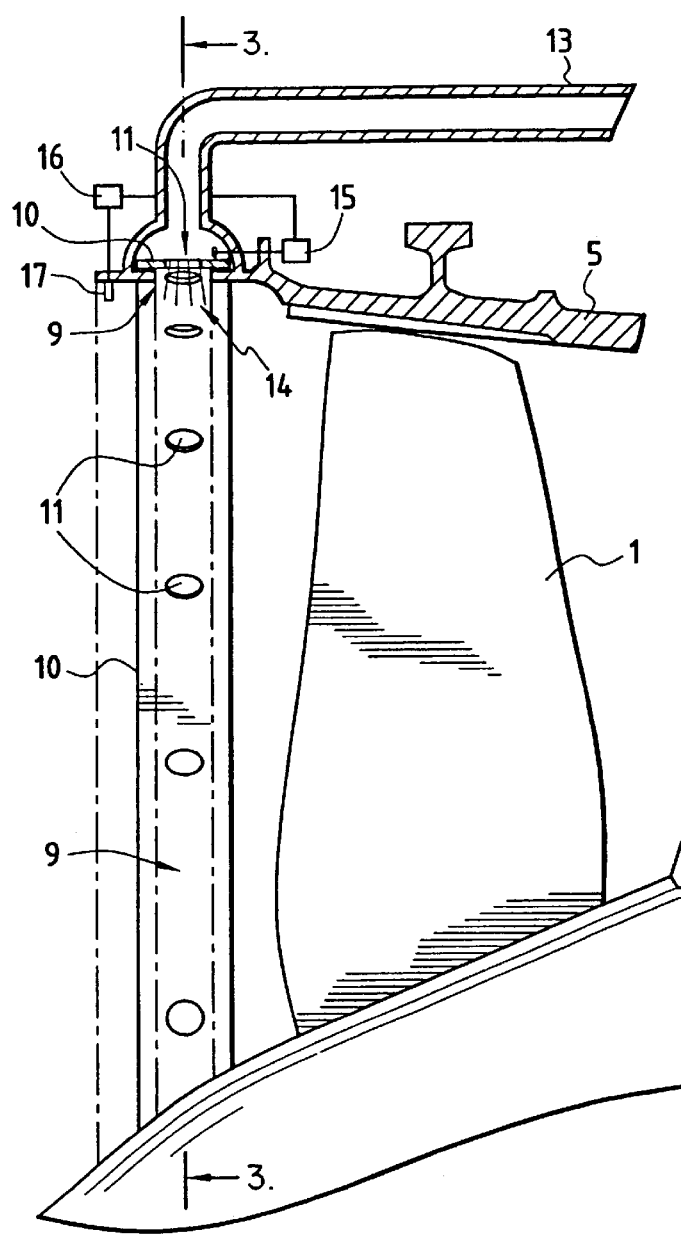
FIG. 2 is an enlarged view of part of FIG. 1 showing the orifices of the device in greater detail.
Figure 3:
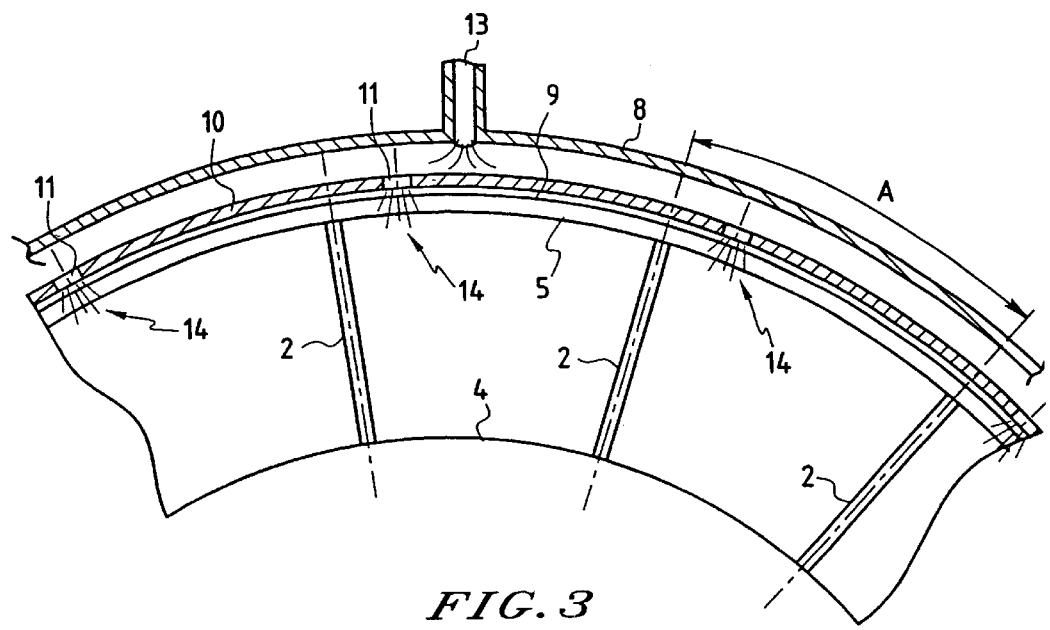
FIG. 3 is a partial front cross-sectional taken along line 3—3 of FIG. 2 of part of a rotating ring carrying the orifices of the device shown in FIGS. 1 and 2.

FIGS. 1 to 3 show an embodiment of the invention in an aircraft bypass turbojet engine where it is required to attenuate the noise arising from the interaction between moving fan blades 1 and fixed vanes 2 of a flow stabilizer, the vanes 2 being disposed downstream of the fan blades 1 in the secondary or cold flow duct 3. The duct 3 is annular and defined internally by an engine casing 4 and externally by the inner wall 5 of an outer casing 6. Radial support arms 7 connect the engine casing 4 to the outer casing 6.

The outer casing 6 comprises, upstream of the vanes 2, a toroidal collector 8 formed with an annular slot 9 on the side near the duct 3. A ring 10 is mounted hermetically in the collector 8, the ring 10 being formed with a number of orifices 11 equal to the number of fixed vanes 2, the orifices 11 facing the slot 9 and being distributed evenly around the rotational axis of the fan. The collector 8 is supplied with compressed air bled from the primary flow through ports 12 and ducts 13 extending to some extent through the arms 7.

Consequently, when the engine is running, air jets 14 are injected through the orifices 11 into the duct 3 upstream of the blades 1. Sound waves are therefore produced by interaction between the jets 14 and the blades 1 at a frequency equal to the frequency of the sound waves produced by interaction between the blades 1 and the vanes 2. A motor 15, controlled by a controller 16 connected to a microphone 17, can rotate the ring 10 through an angle A at least equal to the angular pitch between two consecutive vanes 2.

Clearly, if the ring 10 is rotated through this angle the sound waves arising from the interaction between the jets 14 and the blades 1 experience a $2\pi$ phase shift. Therefore there is always an angular position of the ring where the sound waves arising from the interaction between the jets 14 and the blades 1 are of opposite phase to the sound waves arising from the interaction between the blades 1 and the vanes 2 aft of the blades 1.

In this optimal position, the noise arising from the interaction between the blades 1 and the vanes 2 is attenuated aft of the fan.

The injected air pressure is determined by experiment in accordance with flight conditions or engine speed.

When the invention is used in a conventional turboengine which has no support arms 7 in the flow duct 3, the orifices 11 are distributed evenly and are all identical.

In the case of a turbojet engine fan, the position and diameter of the orifices 11 are calculated so as also to take into account the velocity distortion introduced by the arms 7 and, if applicable, by the pylon.

In the example hereinbefore described, the angular position of the ring 10 relative to the collector 8 is adjusted continuously by the controller 16 in dependence upon the signal provided by the microphone 17.

Figure 5:
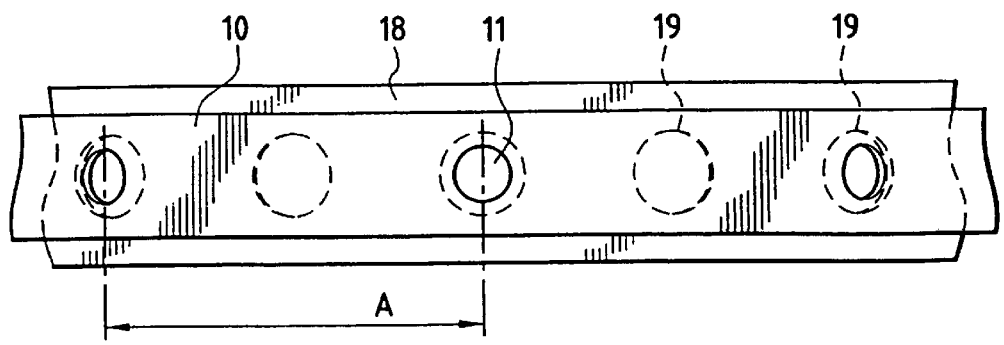
FIG. 5 is a developed view showing an interblade section of a collector and the rotating ring in the second embodiment shown in FIG. 4.
Figure 4:
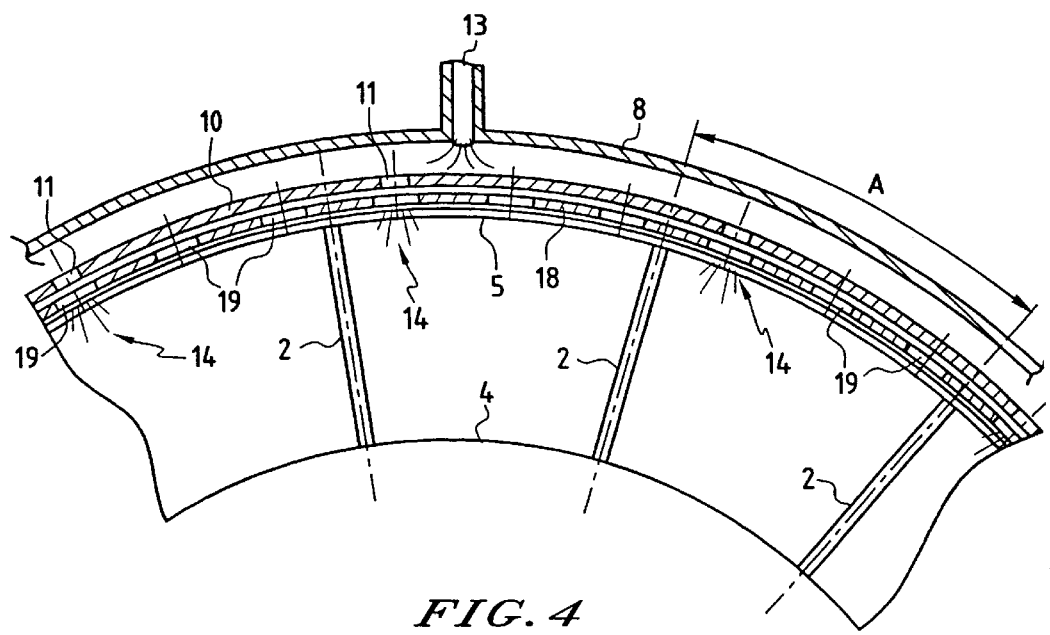
FIG. 4 is a partial front cross-sectional view corresponding to FIG. 3 but illustrating a second embodiment of the invention.

FIGS. 4 and 5 show a constructional variant of the invention. The radially inner wall 18 of the toroidal collector 8 is formed at the angular pitch A with a plurality of evenly distributed apertures 19 instead of the annular slot 9 hereinbefore described. The apertures 19 have a diameter at least equal to the diameter of the largest-diameter orifice 11.

The orifices 11 of the ring 10 can be positioned in front of a set of apertures 19 in dependence upon engine speed.

The ring 10 is also rotated around the rotational axis of the fan by a motor 15 controlled by a controller 16 which receives signals from an electronic engine speed monitor.

We claim:

1. In a turboengine including a flow channel, a ring of rotor blades and a ring of fixed stator vanes disposed in said flow channel downstream of said ring of rotor blades, a process for attenuating noise generated by the interaction between the moving rotor blades and the fixed stator vanes comprising the steps of:

providing a plurality of orifices, equal in number to the number of said fixed stator vanes, opening into said flow channel upstream of said ring of rotor blades;

injecting a fluid into said flow channel through said orifices to form continuous jets of said fluid upstream of said ring of rotor blades; and adjusting the angular position of said orifices relative to said fixed stator vanes whereby sound waves generated by interaction between said jets of fluid and said moving rotor blades are of substantially opposite phase to sound waves generated by interaction between said moving rotor blades and said fixed stator vanes.

2. A process according to claim 1, wherein said angular position of said orifices relative to said fixed stator vanes is adjusted continuously.

3. A process according to claim 1, wherein said angular position of said orifices relative to said fixed stator vanes is adjusted intermittently in dependence upon engine speed.

4. A process according to claim 1 wherein said turboengine is a bypass turbojet engine, said ring of rotor blades is a fan, and said flow channel has support arms extending through it, and wherein the position and diameter of said injection orifices are so calculated as to take into consideration the velocity distortion caused by said support arms.

5. In a turboengine including a casing, a flow channel, a ring of rotor blades and a ring of fixed stator vanes disposed in said flow channel downstream of said ring of rotor blades, a device for attenuating noise generated by the interaction between the moving rotor blades and the fixed stator vanes comprising:

a ring mounted on said casing upstream of said ring of rotor blades and rotatable about the rotational axis of said ring of rotor blades through an angle at least equal to the angular pitch of the fixed stator vanes;

a plurality of orifices, equal in number to the number of said fixed stator vanes, provided in said ring and opening into said flow channel upstream of said ring of rotor blades;

means for injecting a fluid into said flow channel through said orifices to form continuous jets of said fluid upstream of said ring of rotor blades; and means for rotating said ring to adjust the angular position of said orifices relative to said fixed stator vanes whereby sound waves generated by interaction between said jets of fluid and said moving rotor blades are of substantially opposite phase to sound waves generated by interaction between said moving rotor blades and said fixed stator vanes.

6. A device according to claim 5, wherein said means for rotating said ring comprises a motor and a controller for controlling said motor.

7. A device according to claim 6, wherein said ring is disposed in an annular collector which is formed with an annular slot opposite said orifices.

8. A device according to claim 5, wherein said ring is disposed in a collector which is formed opposite the path of said orifices, and said collector is provided, at the angular pitch of said vanes, with a plurality of distributed apertures of a diameter at least equal to the diameter of the corresponding orifice.

9. A device according to claim 8, wherein said means for rotating said ring comprises means for positioning said orifices in front of said apertures in dependence upon engine speed.

* * * * *